March 1, 1955
A. W. FOWLER
2,702,978
LAWN MOWER AND EDGER
Filed June 20, 1949
4 Sheets-Sheet 1
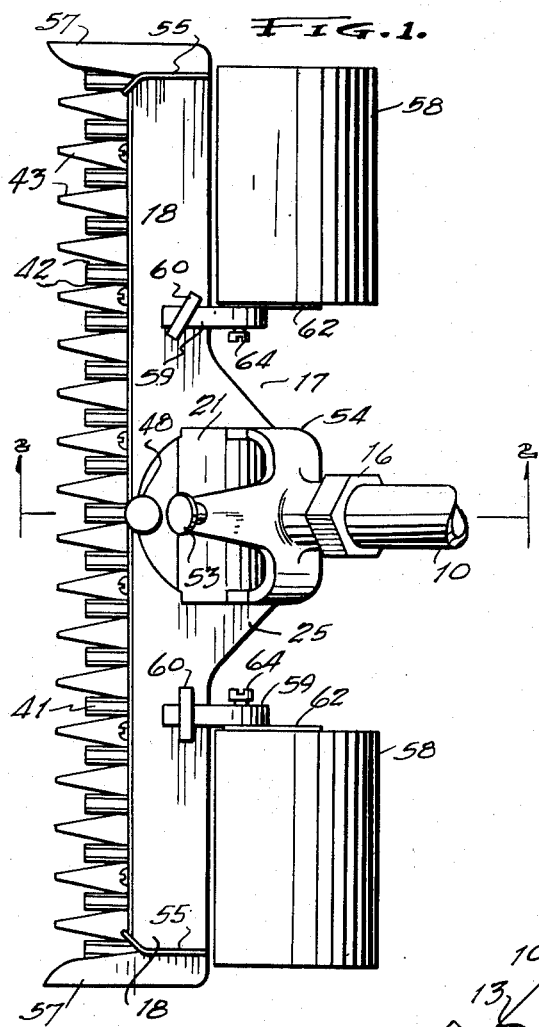
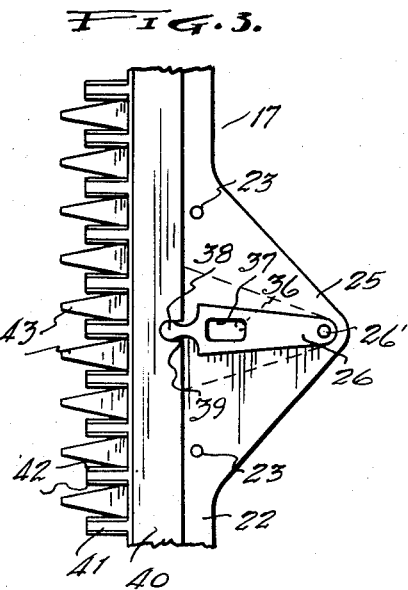
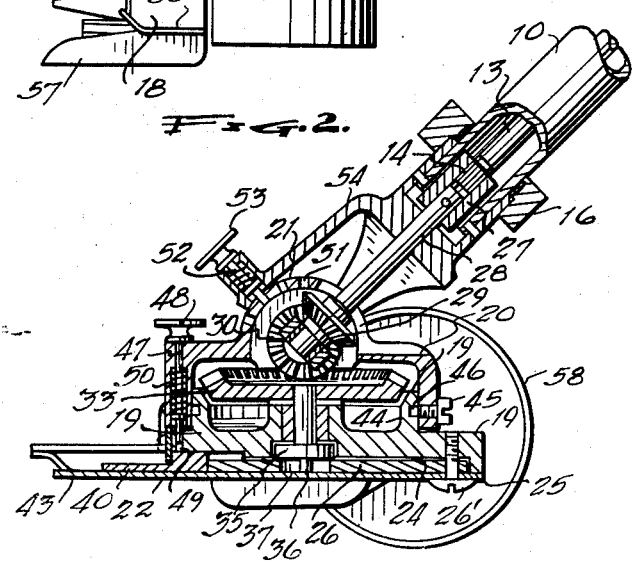
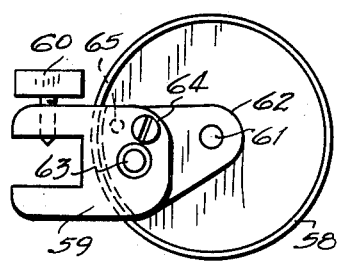
ALVAH W. FOWLER
INVENTOR.
BY *Cecil L. Snood*
ATTORNEY March 1, 1955  A. W. FOWLER  2,702,978
LAWN MOWER AND EDGER
Filed June 20, 1949  4 Sheets-Sheet 2
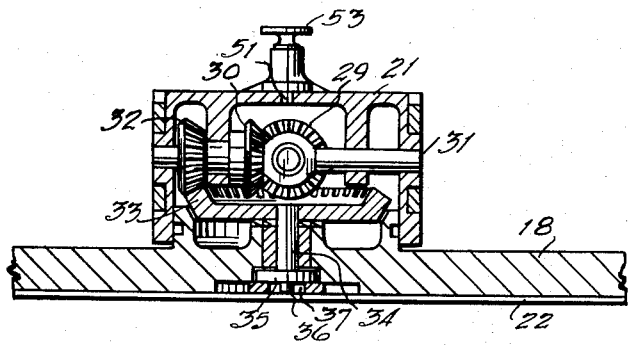
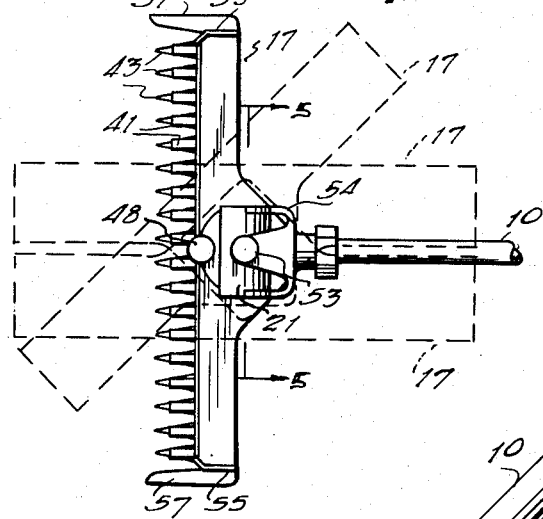
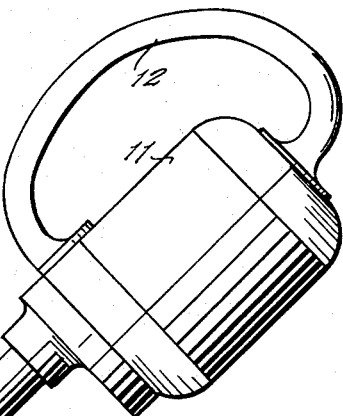
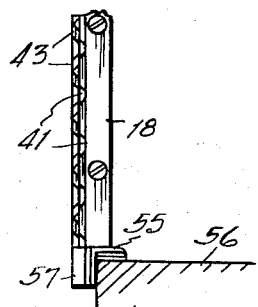
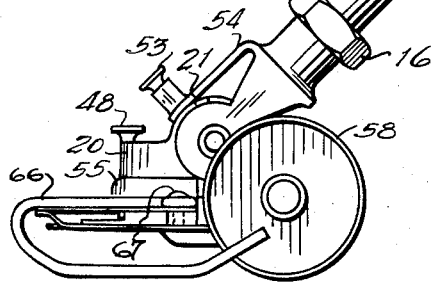
ALVAH W. FOWLER
INVENTOR.
BY
ATTORNEY

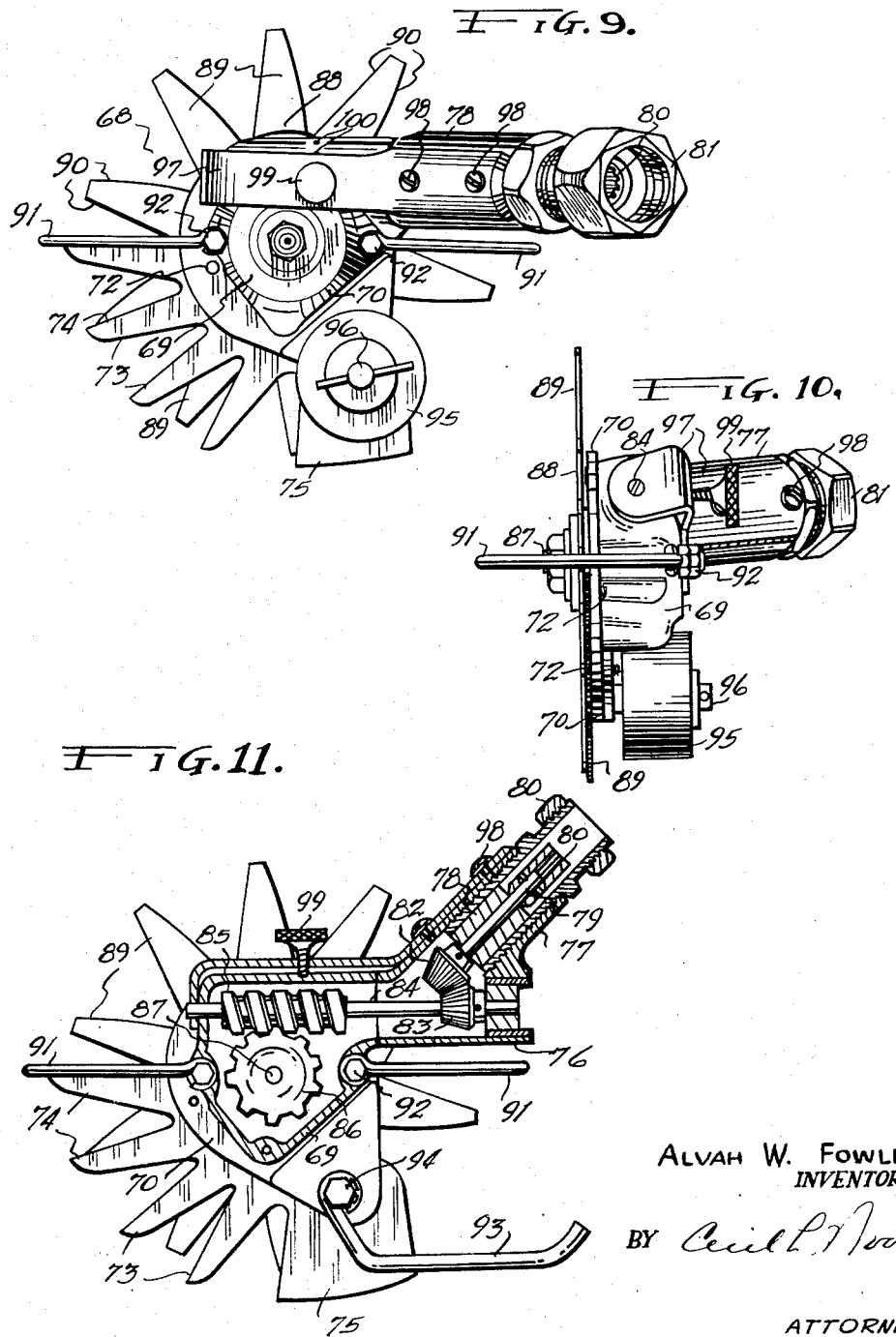

March 1, 1955 A. W. FOWLER 2,702,978
LAWN MOWER AND EDGER
Filed June 20, 1949 4 Sheets-Sheet 4
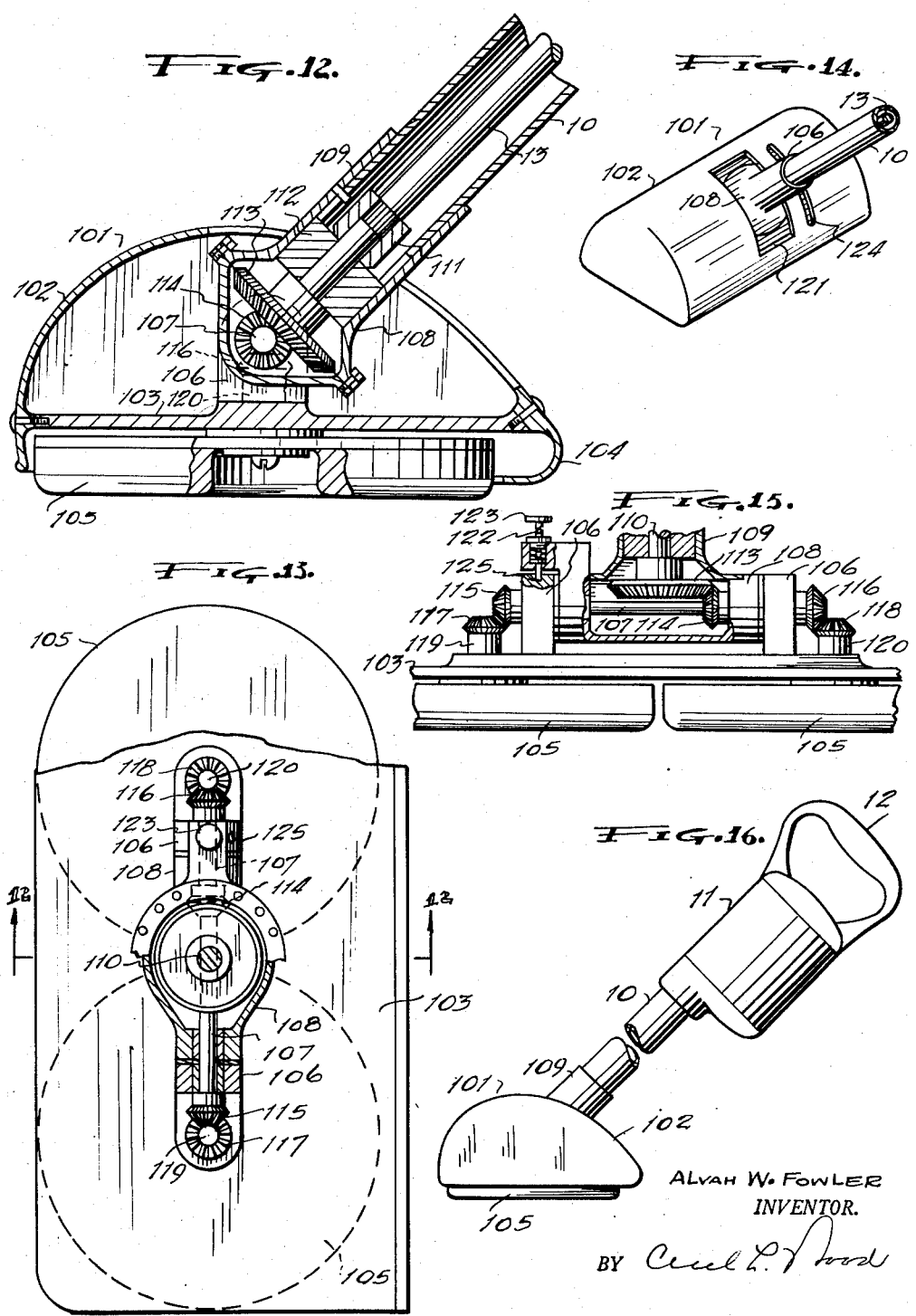
ALVAH W. FOWLER
INVENTOR.
BY
ATTORNEY United States Patent Office 2,702,978
Patented Mar. 1, 1955

2,702,978

LAWN MOWER AND EDGER

Alvah W. Fowler, Fort Worth, Tex.

Application June 20, 1949, Serial No. 100,257

2 Claims. (Cl. 56—26.5)

This invention relates to devices for cutting grass, trimming lawns and hedges, and includes apparatus which embodies features enabling the same to be converted to other uses, such as polishing or waxing floors, and the like, and its principal object resides in the provision of a compact assembly which is capable of being operated from a standing position and having the motive power, or motor, arranged on the upper end of the handle so that the device may be operated with greater ease and convenience, the heavier elements of the invention being arranged so that the assembly can be handled with a minimum of effort.

A prime object of the invention resides in the provision of an arrangement whereby the drive shaft for the assembly is arranged through the handle and the operative head, including a lawn mower, a grass and hedge trimmer, a floor polishing mechanism, and other similar instruments, may be detachably interchangeable with a minimum of difficulty, so that the tool may be employed about the household, in the yard if desirable, and within the house for the purpose of polishing floors, and the like.

A further object of the invention resides in the provision of an economical and light structure, employing a minimum of parts, and affording operative heads capable of being readily adjustable to their uses by simple manually actuated elements by which the operative features of the invention, such as the grass cutting and trimming tools, can be readily and easily adjusted to various positions for more convenient operation, depending upon the particular requirement.

Broadly, the invention contemplates the provision of a utility device, especially useful about the household, embodying flexible features of construction which especially adapt the invention to a variety of uses and seeking to reduce the time and effort usually required for the performance of the operations for which the invention is designed in contrast to conventional devices of similar character.

While the foregoing objects are paramount, other and lesser objects will become manifest as the description proceeds, taken in connection with the appended drawings wherein:

Figure 1 is a plan view of a lawn mower head adapted to be installed on the invention, and comprises an oscillating sickle which is adapted to cooperate with a stationary cutter blade, and illustrating an adjustable arrangement by which the assembly is attached to the handle which is fragmentarily shown.

Figure 2 is a transverse cross-sectional view, on lines 2—2 of Figure 1, illustrating the internal gearing arrangement for the sickle and the lawn mower attachment.

Figure 3 fragmentarily illustrates, in plan, a portion of the lawn mower attachment head, shown in Figure 1, illustrating the actuating mechanism for the oscillating sickle.

Figure 4 is an end elevational view of one of the rollers for the lawn mower attachment, showing the bracket by which the same is adjustably attached to the head.

Figure 5 is a longitudinal cross-sectional view through the gear housing of the lawn mower attachment, taken on lines 5—5 of Figure 7, showing another view of the gearing arrangement in the head, the cutter bar being fragmentarily shown.

Figure 6 is a side elevational broken view on a reduced scale of the lawn mower attachment, including the handle and the motor attachment at the upper end of the handle.

Figure 7 is a plan view on a reduced scale of the lawn mower attachment illustrating, in dotted lines, the several positions of the cutter head with respect to the handle.

Figure 8 fragmentarily illustrates a front view of the cutter head as the device is employed as a grass trimmer along side walks and curbs.

Figure 9 is an elevational view of a rotary type of cutter head utilized for trimming grass and hedges, showing the rotary cutting element employed in a position at right-angles to the handle.

Figure 10 is a front elevational view of the invention in which the cutting element is employed in the manner shown in Figure 9.

Figure 11 illustrates the invention as employed when the rotary element is operated in alignment with the handle, the housing and handle socket being shown in vertical section to illustrate the gear assembly.

Figure 12 illustrates, in transverse section on lines 12—12 of Figure 13, a polishing head attachment secured to the handle and showing, the gearing arrangement for driving the dual opposingly rotated polishing members.

Figure 13 illustrates a plan view of the gear housing of the polishing head in partial longitudinal section showing the gearing assembly and the arrangement of the polishing elements within the housing, shown in dotted lines.

Figure 14 is a rear perspective view of the polishing head illustrating the housing and the adjustable arrangement of the handle.

Figure 15 illustrates the gearing assembly of the polishing head, portions of the housing shown cut away and the polishing elements being shown fragmentarily, and Figure 16 is a side elevational view of the invention showing the driving motor, the handle, and the housing for the polishing head.

It is an object of the invention to provide a utilitarian instrument especially adapted for use around the household and embodying features which will enable the device to be employed with detachable heads for use for different purposes, such as cutting grass, trimming and edging lawns about curbs, side walks, and the like, and by simply changing the head, afford a device which is capable of use as a polishing machine for finishing and waxing flooring, and the like.

Thus, the invention primarily comprises a hollow handle 10 on the upper end of which is attached a motor 11 having a handle 12 by which the assembly can be conveniently manipulated. A flexible shaft 13 is arranged through the hollow handle 10 which has a fluted coupling 14 on its lowermost end adapted to be inserted in a receptacle 15 so that various types of driven mechanical heads can be attached thereto, as illustrated in the drawings. The handle 10 is adapted to be connected by a suitable coupling 16 to different types of mechanical heads so that the latter may be driven by the motor 11, the speed at which the different heads are to be employed being governed by the gearing arrangement in each, which will be hereinafter described.

In one form of the invention, illustrated in Figures 1 to 8, inclusive, a lawn mower attachment is provided which is especially adapted for cutting grass and which employs the reciprocating type of sickle cooperating with a stationary cutter blade and which may be conveniently attached to the handle 10 as will presently become manifest. The grass cutting attachment consists of a head of any convenient length which may be arranged at different angles with respect to the handle 10 for performing such operations as may be required for cutting grass, trimming the grass along curbs, side walks, and against walls, or other inaccessible places not conveniently reached by the ordinary type of grass cutting equipment.

In the present invention the head, generally designated by the reference character 17, comprises an upper plate 18 with which is integrally formed the lower section 19 of a gear housing, illustrated in Figures 2 and 5. The housing is provided with an upper section or cover 20 which has a dome-like portion 21 formed thereon whose axis extends transversely of the handle 10, as apparent in Figure 2. A stationary cutter plate 22 is attached to the plate 18 beneath the gear housing by suitable screws 23 and a V-shaped recess is formed in the plate 18 beneath the housing to afford a triangular cavity 24 in the substantially triangular extended portion 25 rearwardly of the plate 18, as apparent in Figure 2, which operatively accommodates an oscillating lever 26 therein shown in plan in Figure 3 pivotally secured by a screw 26' to the plate 18.

The shaft 13 is coupled through an internally fluted member 27 with a shaft 28 having, at its lower end, a beveled gear 29 which is meshed with a corresponding bevelled gear 30 on a transverse shaft 31 arranged through the upper portion 20 of the housing and which has a bevelled gear 32 thereon meshed with a bevelled ring gear 33 on a vertical stub shaft 34 which has an eccentric 35 at its lower end on which a pin 36 is arranged to operate within an oblong aperture 37 in the arm 26, previously described, to oscillate the latter, as illustrated in dotted lines in Figure 3. On the forward end of the arm 26 is formed a rounded projection 38 which extends into a notch 39 in the rear edge of a sickle 40 which is formed, along its forward edge, with spaced laterally extending blades 41 which have both parallel edges 42 sharpened to cooperate with the fingers 43 of the stationary blade 22 whereby grass and weeds can be cut through a shearing action produced by the oscillating movement of the sickle 40 cooperating with the blade 22 therebeneath.

The lower section 19 of the housing is formed with a circular flange 44 about which the upper section 20 is secured in the manner shown in Figures 1 and 2. The section 20 is secured to the flange 44 of the lower section 19 by screws 45 which extend into a peripheral groove 46 formed about the vertical surface of the circular flange 44 and which retain the sections in rotative relationship to afford adjustability of the head 17 to the dotted line positions shown in Figure 7. A tensioned plunger 47, having a head 48 thereon, is arranged forwardly of the section 20 and is engageable with an aperture 49 in the lower housing section 19 so that, by raising the plunger 47 by the knob 48 thereon against the tension of the spring 50, the upper section may be rotatively adjusted to any desired position and operatively secured in such positions.

It is also contemplated that the handle 10 may be adjusted to different angles with respect to the horizontal cutting plane of the head 17, and provision is made for such an adjustment by a series of apertures 51 arranged transversely of the domed portion 21 of the upper section 20 of the gear housing, as illustrated in Figure 2, and a plunger 52 is provided, having an operative knob 53 thereon, for securing the handle in the different angles which may be convenient in the operation of the device. The plunger 52 is arranged on the spider casting 54 which is pivotally connected to the head 17 by the shaft 31. With such an arrangement the head 17 may be operated in a parallel plane with the handle 10 or at different angles with respect thereto, as shown in Figures 2 and 7.

The head 17, illustrated in Figures 1, 2, 6 and 7, may be employed for the purpose of trimming lawns alongside walks and curbs, as in the illustration shown in the Figure 8. A shoe 55 is attached to both ends of the head 17, in the manner shown in Figures 1 and 7, and normally extends vertically from the head 17 and which is adapted to engage the upper surface of the edge of a sidewalk 56, in the manner shown in Figure 8. A guard member 57 is also arranged on each end of the head 17 and which projects outwardly therefrom at right angles to the shoes 55 to engage the vertical surfaces of the walks or curbs 56 when the device is utilized as a trimming tool. A detachable roller 58, such as those shown in Figures 1 and 4, are preferably employed for attachment to the rear edge of the head 17 for maintaining the head 17 at a desirable spacing with respect to the ground.

A special attaching bracket 59 is provided for each of the rollers 58 in which a screw 60 is arranged for clamping the roller to the rear edge of the head 17 in the manner shown in Figure 1. The spindles 61 of the rollers 58 are secured to auxiliary brackets 62 which are pivotally connected by pins 63 to the mounting brackets 59 and are adjustable on their pivots to vary the spacing of the head 17 from the ground. Screws 64 are arranged in the brackets 59 for securing the auxiliary brackets 62 in adjusted positions by securing the inner ends of the screws 64 in indentations 65 in the auxiliary brackets 62, as shown in Figure 4.

In Figure 6 the head 17 is shown having a shoe 66 formed of heavy wire attached to each end and comprises a sliding support for the head 17 to space the same from the ground. Each of the members 66 is substantially U-shaped and has one end formed with an eye by which it is secured by a screw 67 to the guard member 57 while its opposite end extends downwardly around the forward end of the assembly and rearwardly, extending upwardly at its rearmost end. Thus, a slide is afforded on each end of the head 17.

A rotary type of trimmer head 68 is illustrated in Figures 9, 10 and 11 and is adapted to be connected to the handle 10 in the same manner as the head 17. The head 68 comprises a housing 69 enclosing the gear assembly. The housing 69 is formed with a flange 70 by which a stationary cutter plate 71 is attached to the housing 69 by screws or rivets 72. The plate 71 has a plurality of radially extending fingers 73 which have cutting edges 74 on each side. Adjacent to the fingers 73 is formed a guide blade 75 which normally extends downwardly and serves to engage the ground and guide the assembly in operation.

The housing 69 has a neck portion 76 having a branch 77 extending rearwardly therefrom at an angle. Within the branch 77 is a bearing 78 supporting a short shaft 79 having a coupler 80 on its outer end to receive the lower end of the shaft 13 through the handle 10. A threaded coupler 81 connects the head 68 to the handle 10. At the opposite end of the shaft 79 is a bevel gear 82 meshed with a similar gear 83 on a shaft 84 arranged axially of the neck portion 76, as apparent in Figure 11, on which a worm 85 is arranged and meshes with a worm gear 86 on a transverse stub shaft 87 extending from the side of the housing 69 and drives a rotary blade 88 which cooperates with the stationary blade 71.

The rotary blade 88 has a plurality of radially extended fingers 89 whose opposing edges 90 are sharpened and cooperate with the fingers 73 in a shearing action. A guard 91 embraces the rotary blade 88, having its opposite ends extending around the housing 69, on each side, and formed with eyes whereby the ends are secured by screws 92 to the housing 69, as apparent in Figures 9, 10, and 11. A shoe member 93, similar to the shoe 66 on the head 17, is attached to the flange 70 of the housing 69 by a bolt 94, as shown in Figure 11. In Figures 9 and 10 the head 68 is shown with a roller 95 mounted on a spindle 96 secured in the member 75. The roller 95 is adapted to engage the surfaces of sidewalks, curbs, and the like, in trimming operations.

The neck portion 76 of the housing 69 is pivotally connected to the latter so that the housing 69, with its blades, can be adjusted with respect to the handle 10. A bracket 97 operatively secures the neck portion 76 to the housing 69, having its forward end, which is turned at right angles to the main portion of the member, and is pivoted to the forward end of the shaft 84 while its rearmost end is inclined outwardly and secured to the angular branch 77 of the housing 69 by screws 98.

The head 68 can thus be adjusted to operative positions in alignment with the handle 10 or at right angles thereto, as illustrated in Figures 9 and 10, or 11, respectively. A set screw 99 is arranged through the bracket 97 and is adapted to engage recesses 100 in the housing 69 by which the adjustments are accomplished.

The handle 10 with the motor 11, may be employed also in the use of a polishing head 101, shown in Figures 12 to 16, inclusive. This attachment primarily comprises a housing 102 which is formed with a bottom plate 103 below which a skirt 104 depends affording an operating chamber for a pair of rotary polishing members 105. A pair of spaced bearing supports 106 are formed with the plate 103 and extend upwardly into the housing 102 and operatively support a shaft 107 which is arranged longitudinally of the housing 102, in the manner shown in Figure 15.

A gear housing 108 is pivotally arranged between the supports 106 on the shaft 107 and has a neck portion 109 thereon through which a stub shaft 110 is arranged to be coupled, through a coupler 111, with the shaft 13 in the handle 10. The stub shaft 110 is journalled in a bearing 112 in the neck portion 109 and has a bevelled gear 113 on its inner end which meshes with a smaller bevelled gear 114 on the shaft 107. On the ends of the shaft 107, outside of the gear housing 108, are arranged bevelled gears 115 and 116 which mesh with similar gears 117 and 118 on the upper ends of the stub shafts 119 and 120 of the polishing members 105 whereby these members are rotated in opposite directions.

The handle 10 can be adjusted upwardly and downwardly by the pivotal mounting of the gear housing 108 to which it is attached, the neck portion of the gear housing 103, to which the handle 10 is connected extending through a vertical oblong opening 121 in the housing 102, as in Figure 14. The handle 10 is secured in its various adjustments with respect to the housing 102 by a tensioned plunger 122 which has a head 123 thereon extending through a slot 124 in the housing 102 near the opening 121 therein. The operative end of the plunger 122 is adapted to engage a series of recesses 125 arranged about the top of one of the bearing supports 106, as shown in Figures 13 and 15.

Manifestly, the structure herein shown and described is capable of certain changes and modifications from time to time, by persons skilled in the art, without departing from the spirit and intent of the invention or the scope of the appended claims.

What is claimed is:

1. In a grass cutting and trimming device having an operating handle and a motor connected thereto, in combination, a driving head on said handle and a gear housing pivotally connected to said head opposite said motor, a stationary cutting plate, having blades formed thereon, connected to said housing, a driven sickle member cooperatively associated with said cutting plate, a gear assembly in said housing operatively connected to said motor, an oscillating lever pivoted at one end to said cutting plate and having a driven connection at its opposite end with said sickle member, an eccentric member driven by said gear assembly oscillating said lever, and means rotatively associating said cutting plate and said sickle to said housing whereby the same can be operated in various positions with respect to said handle.

2. In a trimmer for lawns and hedges having a motor and a handle and a driven shaft in said handle, in combination, a gear housing on said handle opposite said motor and adjustably pivoted thereto, a stationary cutter plate attached to said housing for rotative adjustment thereon and having a plurality of cutting blades formed thereon, a sickle member cooperating with said cutter plate, a gear assembly in said housing operating said sickle member, an oscillating lever pivotally connected to said stationary plate at one end and having connection at its opposite end to said sickle member, a shaft having an eccentric thereon and driven by said gear assembly operating said lever to oscillate said sickle member, the said cutter plate and said sickle having a pivotal connection with said housing providing for rotative adjustment with respect to said handle and said housing.

References Cited in the file of this patent

UNITED STATES PATENTS

| 1,352,326 | Swatzell | Sept. 7, 1920 |
| 1,426,989 | Janes et al. | Aug. 22, 1922 |
| 1,660,764 | Pidlisny | Feb. 28, 1928 |
| 2,263,431 | White | Nov. 18, 1941 |

FOREIGN PATENTS

| 405,732 | Great Britain | Feb. 15, 1934 |
| 414,924 | Great Britain | Aug. 16, 1934 |